(12) United States Patent
Miyazaki et al.

(10) Patent No.: US 7,432,003 B2
(45) Date of Patent: Oct. 7, 2008

(54) MIXING TANK FOR FUEL CELL

(75) Inventors: Kaname Miyazaki, Yokohama (JP);
Eiichi Sakaue, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 737 days.

(21) Appl. No.: 10/717,568

(22) Filed: Nov. 21, 2003

(65) Prior Publication Data

US 2004/0115506 A1 Jun. 17, 2004

(30) Foreign Application Priority Data

Nov. 22, 2002 (JP) .............................. 2002-340065

(51) Int. Cl.
*H01M 8/04* (2006.01)
(52) U.S. Cl. .............................. 429/17; 429/34; 429/39
(58) Field of Classification Search .................... 429/17, 429/19, 39, 34
See application file for complete search history.

(56) References Cited

U.S. PATENT DOCUMENTS

| 4,562,123 | A | * | 12/1985 | Shimizu et al. | ............... | 429/27 |
| 6,808,838 | B1 | * | 10/2004 | Wilson | ........................ | 429/34 |
| 2004/0115506 | A1 | | 6/2004 | Miyazaki et al. | | |

FOREIGN PATENT DOCUMENTS

| JP | 4-14473 | 3/1992 |
| JP | 04-229957 | 8/1992 |
| JP | 2003-109633 | 4/2003 |
| JP | 2003-142135 | 5/2003 |
| JP | 2004-507049 | 3/2004 |
| WO | WO 02/015306 | 2/2002 |

OTHER PUBLICATIONS

U.S. Appl. No. 10/717,568, filed Nov. 21, 2003, Miyazaki et al.
U.S. Appl. No. 10/776,289, filed Feb. 12, 2004, Hisano et al.
U.S. Appl. No. 11/072,301, filed Mar. 7, 2005, Sato et al.

* cited by examiner

*Primary Examiner*—Patrick Ryan
*Assistant Examiner*—Ben Lewis
(74) *Attorney, Agent, or Firm*—Oblon, Spivak, McClelland, Maier & Neustadt, P.C.

(57) ABSTRACT

A mixing tank for a fuel cell is provided with a container housing fuel for the fuel cell, an absorbent member housed in the container, which has a cavity therein, an inlet flow path interconnecting the fuel cell and the container so as to conduct an exhaust from the fuel cell to the container and admix the exhaust with the fuel to form a mixture absorbed in the absorbent member, an exhaust flow path interconnecting the cavity and an outside of the mixing tank so as to conduct gas to the outside and an outlet flow path interconnecting the absorbent member and the fuel cell so as to conduct the mixture absorbed in the absorbent member to the fuel cell.

8 Claims, 6 Drawing Sheets

MIXING TANK FOR FUEL CELL

CROSS-REFERENCE TO RELATED APPLICATIONS

This application is based upon and claims the benefit of priority from the prior Japanese Patent Application No. 2002-340065 (filed Nov. 22, 2002); the entire contents of which are incorporated herein by reference.

BACKGROUND OF THE INVENTION

1. Field of the Invention

The present invention relates to a mixing tank for a fuel cell, which recovers water from exhaust gas of the fuel cell and can be utilized however the mixing tank is oriented.

2. Description of the Related Art

In general, a fuel cell is provided with an anode 103, a cathode 105 and an electrolyte film 107 put therebetween as shown in FIG. 1, in which a direct methanol fuel cell is exemplified. FIG. 2 shows an example of a fuel cell system considered to be a general constitution thereof. Fuel (methanol in this case) is supplied to the anode 103 by mean of a pump 111 and gas (generally air) which contains oxidant (generally oxygen) is supplied to the cathode 105 by means of a pump 113. At the anode 103 and the cathode 105 the following reactions progress respectively.

At the anode 103;

$$CH_3OH + H_2O \rightarrow CO_2 + 6H^+ + 6e^- - 121.9 \text{ kJ/mol} \quad (1)$$

At the cathode 105;

$$3/2O_2 + 6H^+ + 6e^- \rightarrow 3H_2O + 141.95 \text{ kJ/mol} \quad (2)$$

If the protons and the electrons are freely transported between the anode 103 and the cathode 105, net reaction as described below is completed in the fuel cell. Thereby an electric power generation cannot be achieved.

$$CH_3OH + 3/2O_2 \rightarrow CO_2 + 2H_2O + 20.05 \text{ kJ/mol} \quad (3)$$

However, the electrolyte film 107 has a cation selectivity so that cations (protons in this case) are selectively transported therethrough in preference to anions (electrons in this case). Therefore the electrons are extracted from the fuel cell so that electric power generation is made possible as shown in FIG. 1. In the course of the power generation, carbon dioxide is generated at the anode 103 and water is generated at the cathode 105.

To develop the cation selectivity, it is necessary to humidify the electrolyte film 107 with water. There is a proposed art in which water is admixed to the fuel housed in a fuel tank in advance so as to be supplied to the electrolyte film 107.

Various applications of the fuel cell are proposed and one of them is a power supply of a mobile electronic device. In a case where the fuel cell is applied to the mobile electronic device, the fuel cell and the fuel tank installed in the mobile electronic device are oriented to various orientations. The fuel must be stably supplied to the fuel cell in whatever manner the electronic device is oriented.

A related art is disclosed in Japanese Patent Publication (Examined) No. H04-14473.

SUMMARY OF THE INVENTION

According to the related art, even when the fuel tank is oriented upside down, the fuel housed in the fuel tank can be supplied to the fuel cell. However, the fuel tank of the related art is not configured to recover water from an exhaust of the fuel cell. Therefore water must be admixed to the fuel in advance as in the proposed art described above. The fuel is diluted by water so that an energy concentration is decreased in contrast with a case where a concentrated fuel is employed.

The present invention had been achieved in view of the above problem and is intended for providing a mixing tank for a fuel cell, which recovers water from exhaust gas of the fuel cell and can be utilized however the mixing tank is oriented.

According to a first aspect of the invention, a mixing tank for a fuel cell is provided with a container housing fuel for the fuel cell, an absorbent member housed in the container, which has a space, an inlet flow path interconnecting the fuel cell and the container so as to conduct an exhaust from the fuel cell to the container and admix the exhaust with the fuel to form a mixture absorbed in the absorbent member, an exhaust flow path interconnecting the space and an outside of the mixing tank so as to conduct gas to the outside and an outlet flow path interconnecting the absorbent member and the fuel cell so as to conduct the mixture absorbed in the absorbent member to the fuel cell.

According to a second aspect of the invention, a mixing tank for a fuel cell is provided with a container housing fuel for the fuel cell, an inlet flow path interconnecting the fuel cell and the container so as to conduct an exhaust from the fuel cell to the container and admix the exhaust with the fuel to form a mixture, a swivel shaft including an outlet flow path and an exhaust flow path therein, which penetrates a side of the container and is rotatably attached thereto, a gas collector tube connected to and communicating with the exhaust flow path, a mixture collector tube connected to and communicating with the outlet flow path, the mixture collector tube being substantially disposed opposite to the gas collector tube, the gas collector tube substantially disposed opposite to the mixture collector tube and a weight attached to the mixture collector tube so that the mixture collector tube is oriented downward and the gas collector tube is oriented upward.

According to a third aspect of the invention, a mixing tank for a fuel cell is provided with a container housing fuel for the fuel cell, an inlet flow path interconnecting the fuel cell and the container so as to conduct an exhaust from the fuel cell to the container and admix the exhaust with the fuel to form a mixture, an exhaust flow path interconnecting the container and an outside of the container so as to conduct gas to the outside, an outlet flow path interconnecting the container and the fuel cell, a gas collector flexible tube connected to and communicating with the exhaust flow path, a floating member attached to the gas collector flexible tube so that an end of the gas collector flexible tube is projected upward from the mixture, a mixture collector flexible tube connected to and communicating with the outlet flow path and a weight attached to the mixture collector flexible tube so that the mixture collector flexible tube is sunk in the mixture.

According to a fourth aspect of the invention, a fuel cell system is provided with a fuel cell having an anode, a cathode and an electrolyte membrane put therebetween, a container housing fuel for the fuel cell, an absorbent member housed in the container, the absorbent member having a cavity therein, an inlet flow path interconnecting the fuel cell and the container so as to conduct an exhaust from the fuel cell to the container and admix the exhaust with the fuel to form a mixture absorbed in the absorbent member, an exhaust flow path interconnecting the cavity and an outside of the mixing tank so as to conduct gas in the cavity to the outside, an outlet flow path interconnecting the absorbent member and the fuel cell so as to conduct the mixture absorbed in the absorbent member to the fuel cell and an air supply unit supplying air to the cathode.

According to a fifth aspect of the invention, a fuel cell system is provided with a fuel cell having an anode, a cathode and an electrolyte membrane put therebetween, a container housing fuel for the fuel cell, an inlet flow path interconnecting the fuel cell and the container so as to conduct an exhaust from the fuel cell to the container and admix the exhaust with the fuel to form a mixture, a swivel shaft including an outlet flowpath and an exhaust flow path therein, penetrating a side of the container and being rotatably attached thereto, a gas collector tube connected to and communicating with the exhaust flow path, a mixture collector tube connected to and communicating with the outlet flow path, the mixture collector tube being substantially disposed opposite to the gas collector tube, a weight attached to the mixture collector tube so that the mixture collector tube is oriented downward and the gas collector tube is oriented upward and an air supply unit supplying air to the cathode.

According to a sixth aspect of the invention, a fuel cell system is provided with a fuel cell having an anode, a cathode and an electrolyte membrane put therebetween, a container housing fuel for the fuel cell, an inlet flow path interconnecting the fuel cell and the container so as to conduct an exhaust from the fuel cell to the container and admix the exhaust with the fuel to form a mixture, a swivel shaft including an outlet flow path and an exhaust flow path therein, penetrating a side of the container and being rotatably attached thereto, a gas collector tube connected to and communicating with the exhaust flow path, a mixture collector tube connected to and communicating with the outlet flow path, the mixture collector tube being substantially disposed opposite to the gas collector tube, a weight attached to the mixture collector tube so that the mixture collector tube is oriented downward and the gas collector tube is oriented upward and an air supply unit supplying air to the cathode.

DETAILED DESCRIPTION OF THE INVENTION

A first embodiment of the present invention will be described hereinafter with reference to FIG. 3.

A mixing tank 13 of the first embodiment is provided with a mixing container 15, which houses a liquid absorbent member 17 for absorbing liquid. The liquid absorbent member 17 is made of an appropriate material such as any porous material, for example, a sponge, so as to employ capillary force or the like. A cavity 19 is formed in the liquid absorbent member 17 and is positioned substantially at a center, and more particularly at a gravity center, of the mixing container 15.

Figure 1:
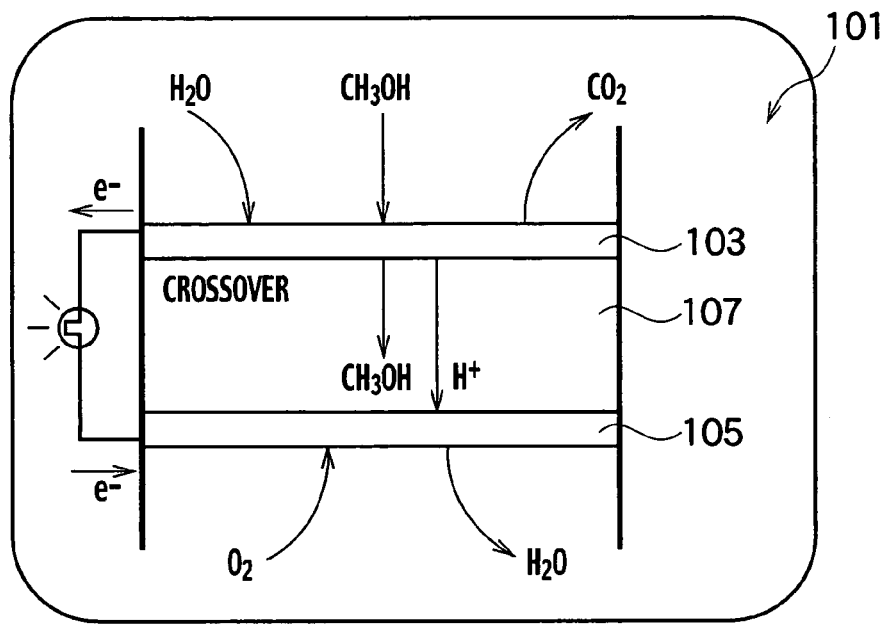
FIG. 1 is a schematic drawing of a direct methanol fuel cell according to a prior art.
Figure 2:
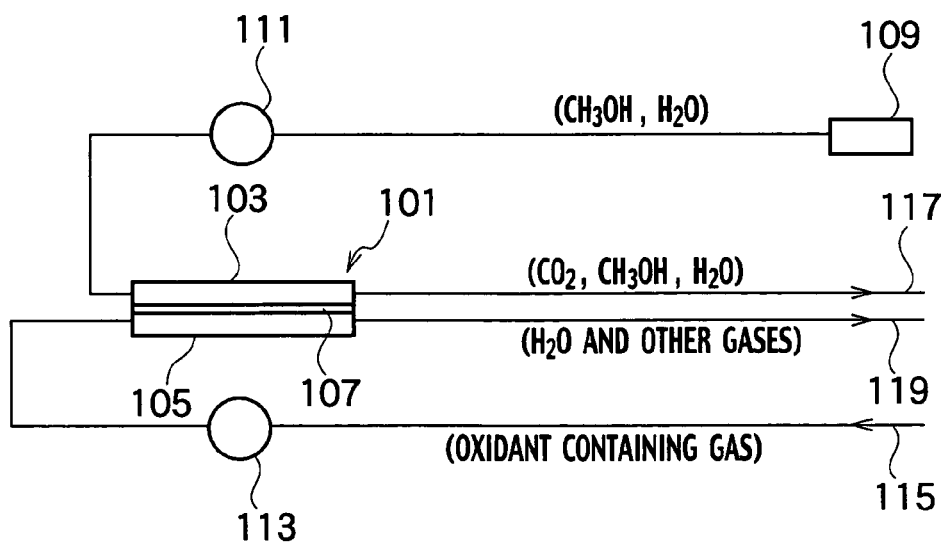
FIG. 2 is a schematic drawing of a fuel cell system according to a prior art.
Figure 3:
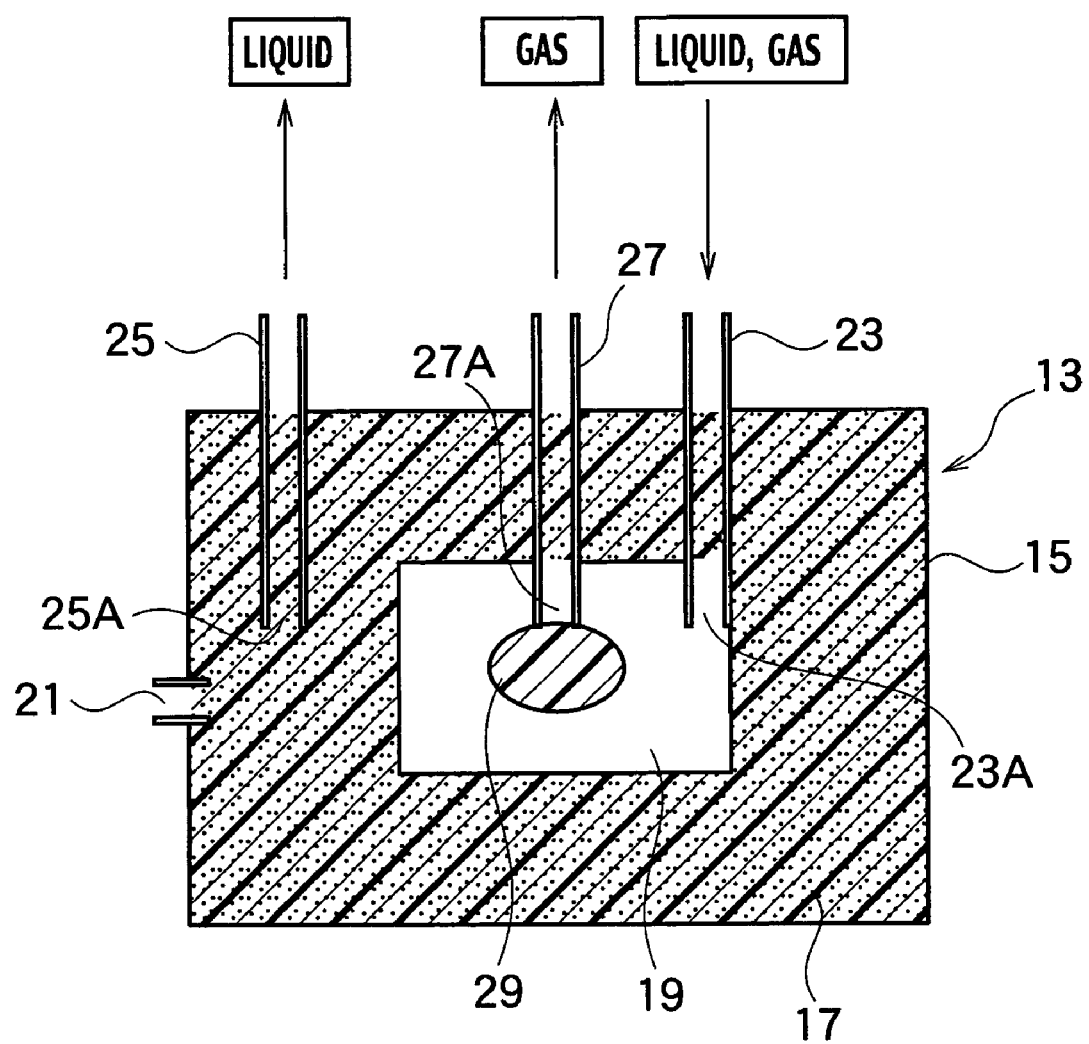
FIG. 3 is a schematic drawing of a mixing tank according to a first embodiment of the present invention.

The cavity 19 is drawn in FIG. 3 as being substantially enclosed by the liquid absorbent member 17. Though such a constitution can be applied, alternatively the absorbent member 17 and the mixing container 15 may be configured so that one end of the cavity 19 is not covered by the liquid absorbent member 17 and communicates with any one surface of the inner surfaces of the mixing container 15. Any constitution may be applied as long as the liquid absorbent member 17 is in contact with every inner surface of the mixing container 15 and supported thereby.

The mixing container 15 is provided with a fuel inlet port 21, to which methanol as fuel is supplied from a fuel tank (not shown), and an exhaust inlet flow path 23, to which exhaust is supplied from a fuel cell (not shown). The exhaust includes water, carbon dioxide and methanol left unreacted in the fuel cell. The exhaust inlet flow path 23 is a tubular member and an inner end 23A thereof reaches the cavity 19.

The water and the unreacted methanol included in the exhaust are effectively absorbed into the liquid absorbent member 17. On the other hand, gaseous fractions of the exhaust, such as the carbon dioxide, diffuse into the cavity 19. Thereby the methanol supplied from the fuel inlet port 21 is mixed with the water and the unreacted methanol supplied from the exhaust inlet flow path 23 at the liquid absorbent member 17 so as to form a mixture.

The mixing container 15 is further provided with a mixture outlet flow path 25 and an exhaust outlet flow path 27, through which the mixture and gas contained in the mixing container 15 are respectively discharged outward. The mixture outlet flow path 25 is a tubular member and an inner end 25A thereof is buried in the liquid absorbent member 17. Thereby the mixture is discharged to the fuel cell via the mixture outlet flow path 25.

The exhaust outlet flow path 27 is also a tubular member and an inner end 27A thereof is disposed substantially at a center of the cavity 19. The inner end 27A is provided with a gas-liquid separation membrane 29 which blocks penetration of liquid and allows penetration of gas. Thereby, in a case where the liquid contained in the liquid absorbent member 17 is supersaturated so as to spill out into the cavity 19, the liquid is prevented from discharging out of the exhaust outlet flow path 27 and the exhaust gas is stably exhausted out of the exhaust outlet flow path 27.

The constitution of the mixing tank 13 is such that the methanol supplied from the fuel inlet port 21 is mixed with the liquid consisting of the water and the unreacted methanol supplied from the fuel cell therein so as to form the mixture. The mixture is further supplied to the fuel cell via the mixture outlet flow path 25. The gas supplied from the fuel cell diffuses into the cavity 19 and is further exhausted through the exhaust outlet flow path 27 via the gas-liquid separation membrane 29.

The liquid absorbent member 17 steadily absorbs the liquid in the mixing container 15 so that the cavity 19 is prevented from being filled with the liquid. Thereby stable exhausting of the gas is ensured.

The mixing container 15 can be oriented to various directions. However the mixing tank container 15 is oriented, the mixture is conducted upward to the inner end 25A by means of the capillary force of the liquid absorbent member 17.

Thereby the mixture can be stably supplied to the fuel cell.

The mixing container 15 can be provided with two or more mixture outlet flow paths 25. In this case, the plurality of the mixture outlet flow paths 25 should be disposed apart from each other so that any of the mixture outlet flow paths 25 is at the underside of the mixing container 15 no matter how the mixing container 15 is oriented. The constitution is such that the mixture can be stably supplied to the fuel cell.

Figure 4:
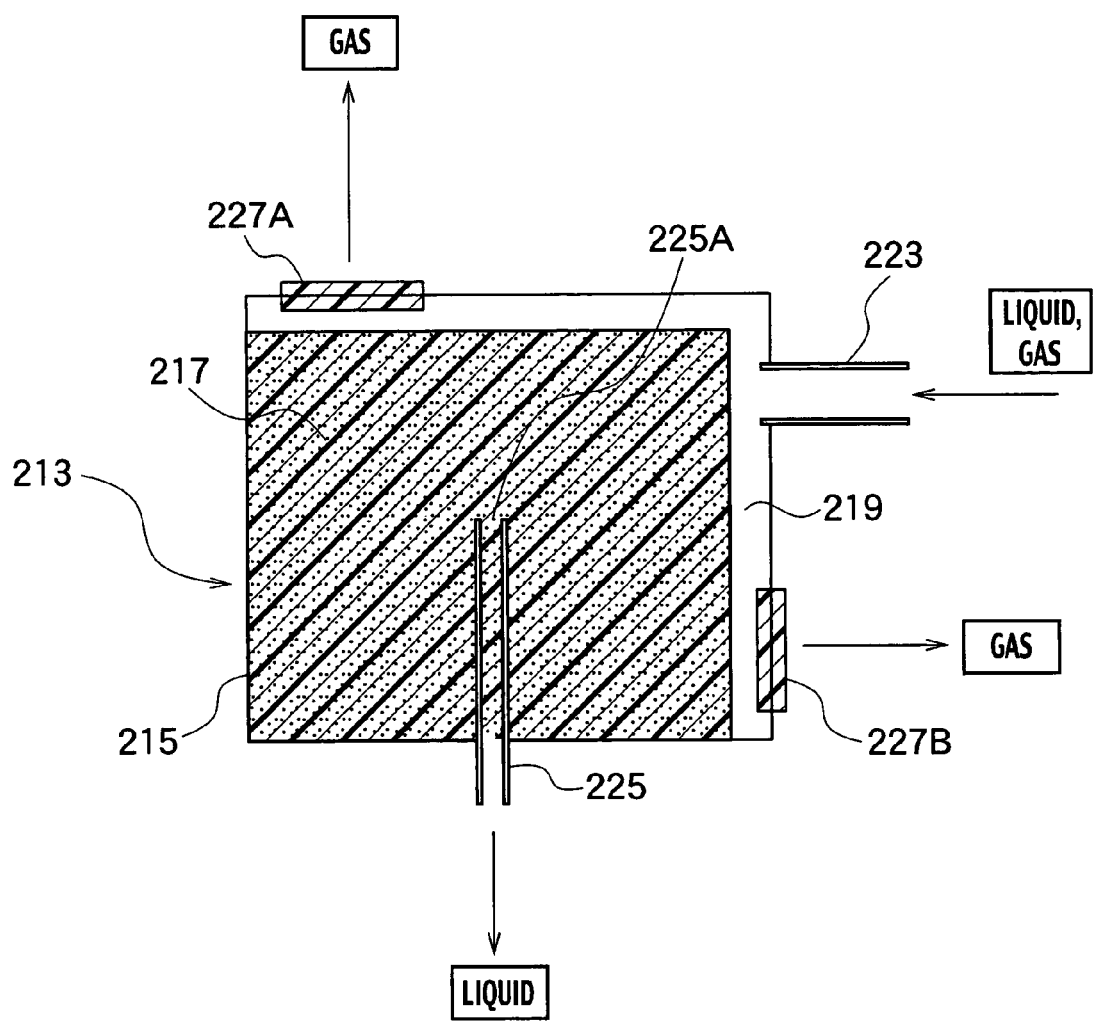
FIG. 4 is a schematic drawing of a mixing tank according to a modification of the first embodiment of the present invention.

The aforementioned first embodiment can be modified into a modification as shown in FIG. 4. A mixing tank 213 according to the modification is provided with a mixing container 215 housing a liquid absorbent member 217 of an approximate material such as any porous materials, similar to the aforementioned description. The liquid absorbent member 217 is not provided with a cavity therein. Instead, gaps 219 are provided between the liquid absorbent member 217 and one or more inner surfaces of the mixing container 215. The mixing container 215 is further provided with and an exhaust inlet flow path 223, to which exhaust is supplied from a fuel cell (not shown), as in the aforementioned constitution, so that a mixture is formed in the liquid absorbent member 217.

The mixing tank 213 is provided with exhaust openings 227A and 227B respectively opposed to the gaps 219 so that gas contained in the gaps 219 is discharged therefrom. The exhaust opening 227A is preferably disposed apart from the exhaust opening 227B as shown in FIG. 4. According to such constitution, in a case where either of the exhaust opening 227A or the exhaust opening 227B is blocked by liquid, the remaining opening thereof assures exhausting of the gas. Alternatively, the exhaust opening 227A can be disposed in the vicinity of the exhaust opening 227B or one of them can be omitted. Furthermore, the exhaust openings 227A and 227B can be respectively provided with gas-liquid separation membranes.

The mixing container 215 is further provided with a mixture outlet flow path 225 for discharging the mixture outward. An inner end 225A thereof is positioned substantially at a center, more particularly a gravity center, of the liquid absorbent member 217. The mixture absorbed in the liquid absorbent member 217 is steadily transported to the inner end 225A by a capillary force thereof. Furthermore, because the inner end 225A is positioned substantially at a center of the liquid absorbent member 217, the mixture is assured to be transported no matter how the mixing container 215 is oriented. More specifically, similar effects as the aforementioned constitution of the first embodiment can be obtained.

Appropriate fixation means for fixing the mixing container 215 so as to prevent the liquid absorbent member 217 from displacement in the mixing container 215 maybe provided inside of the mixing container 215. In a case where the fixation means is provided, the liquid absorbent member 217 is prevented from displacement and stably carries out the functions thereof. As such fixation means, either a plurality of projections formed on the inner surfaces of the mixing container 215 or an appropriate adhesive can be employed.

Figure 5A:
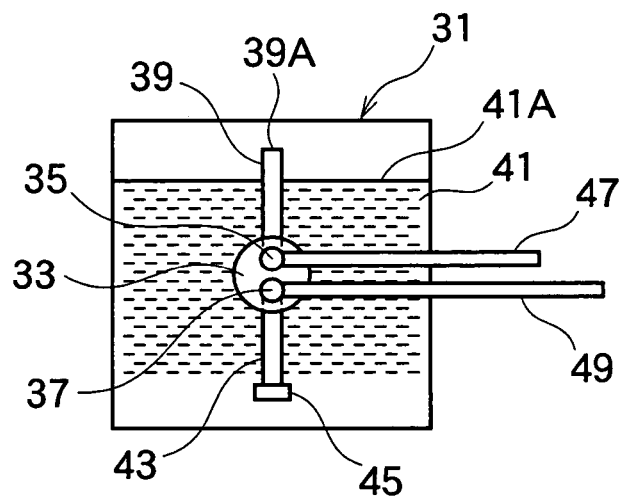
FIG. 5A is a schematic drawing of a mixing tank according to a second embodiment of the present invention.

A second embodiment of the present invention will be described hereinafter with reference to FIG. 5A.

A mixing container 31 of the second embodiment is provided with a swivel shaft 33, which penetrates one surface thereof and is rotatably attached thereto. The swivel shaft 33 is preferably supported at both sides thereof, however, it can be supported at one side thereof.

The swivel shaft 33 is provided with an exhaust outlet flow path 35 and a mixture outlet flow path 37, both of which penetrate the swivel shaft 33 and are in parallel with an axis thereof. At an inside of the mixing container 31, a gas collector tube 39 is integrally formed on the swivel shaft 33. A distal end of the gas collector tube 39 is projected from a liquid level 41A of a mixture liquid 41 housed in the mixing container 31 and is provided with an opening 39A. The gas collector tube 39 communicates with the exhaust outlet flow path 35 so that gas over the liquid level 41A can flow therethrough.

Further, a mixture collector tube 43 is integrally formed on the swivel shaft 33. The mixture collector tube 43 is substantially opposed to the gas collector tube 39 and a distal end thereof is sunk in the mixture liquid 41. The mixture collector tube 43 communicates with the mixture outlet flow path 37 so that the mixture liquid 41 can flow therethrough. The distal end of the mixture collector tube 43 is provided with a weight 45 so that the mixture collector tube 43 is constantly oriented downward and the gas collector tube 39 is constantly oriented upward.

The swivel shaft 33, at an outside of the mixing container 31, is integrally provided with an exhaustion tube 47 which communicates with the exhaust outlet flow path 35 and a mixture supply tube 49 which communicates with the mixture outlet flow path 37. The mixture supply tube 49 composes a part of a mixture supply path to the fuel cell.

Similarly to the first embodiment, the mixing container 31 is provided with a fuel inlet port, to which methanol as fuel is supplied from a fuel tank (not shown), and an exhaust inlet flow path, to which exhaust is supplied from the fuel cell (not shown).

The aforementioned constitution allows the mixing container 31 to rotate around the swivel shaft 33. In any orientation where the mixing container 31 is oriented, the opening 39A of the gas collector tube 39 is constantly projected from the liquid level 41A of the mixture liquid 41. Therefore the gas in the mixing container 31 is exhausted from the exhaustion tube 47 via the gas collector tube 39 and the exhaust outlet flow path 35. Further, the distal end of the mixture collector tube 43 is constantly sunk in the mixture liquid 41, thereby the mixture liquid 41 is stably discharged to the fuel cell via the mixture collector tube 43, the mixture outlet flow path 37 and the mixture supply tube 49.

Figure 5B:
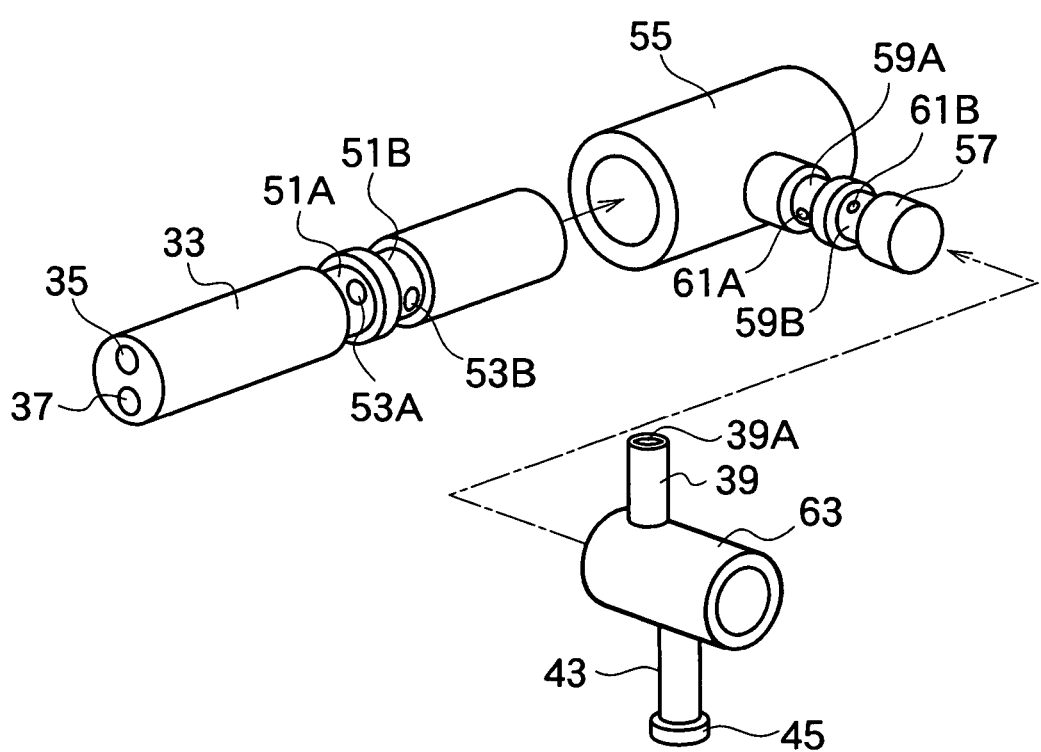
FIG. 5B is an exploded perspective view of the mixing tank according to a modified example of the second embodiment.

To increase freedom degrees of the movement of the mixing container, the aforementioned constitution should be modified into a constitution described below with reference to FIG. 5B.

The swivel shaft 33 is provided with peripheral grooves 51A and 51B, which are positioned at an inside of the mixing container 31 when installed. The peripheral groove 51A is provided with a communication hole 53A communicating with the exhaust outlet flow path 35. The peripheral groove 51B is provided with a communication hole 53B communicating with the mixture outlet flow path 37. Meanwhile, in this case, the swivel shaft 33 can be fixed to the mixing container 31.

A rotary shaft 55 is rotatably attached to the swivel shaft 33. The rotary shaft 55 is provided with a support axis 57 oriented perpendicular to an axis of the rotary shaft 55. The rotary shaft 55 is further provided with peripheral grooves 59A and 59B which are respectively provided with communication holes 61A and 61B. The communication hole 61A communicates with the communication hole 53A through an inside of the support axis 57. Even if the rotary shaft 55 rotates around the swivel shaft 33, the peripheral groove 51B assures the communication between the communication hole 53A and the communication hole 61A. In a similar manner, the communication hole 61B is kept to communicates with the communication hole 53B in a steady state.

A swinging shaft 63 is rotatably attached to the rotary shaft 55. The gas collector tube 39 and the mixture collector tube 43 with the weight 45 described above are formed on the swinging shaft 63. However, in contrast to the above second embodiment, the gas collector tube 39 is not aligned with the mixture collector tube 43. The gas collector tube 39 is formed in a position corresponding to the peripheral groove 59A so as to communicate with the communication hole 61A. Likewise, the mixture collector tube 43 is formed in a position corresponding to the peripheral groove 59B so as to communicate with the communication hole 61B.

As will be understood from the above description, the gas collector tube 39 is kept in communication with the exhaust outlet flow path 35 however the rotary shaft 55 and the swinging shaft 63 are oriented. Likewise, the mixture collector tube 43 is kept in communication with the mixture outlet flow path 37 in a steady state.

When the mixing container 31 rotates around the swivel shaft 33, the rotary shaft 55 rotates around the swivel shaft 33. When the mixing container 31 rotates around an axis perpendicular to the swivel shaft 33, the swinging shaft 63 rotates around the support axis 57. When the mixing container 31 rotates around an axis other than the above two axes, both of the rotary shaft 55 and the swinging shaft 63 rotate in a coordinated manner. Thereby the gas collector tube 39 is kept oriented upward in a steady state however the mixing container 31 is oriented.

Preferably, in the aforementioned constitution, the opening 39A of the gas collector tube 39 is further provided with a gas-liquid separation membrane and the distal end of the mixture collector tube 43 is further provided with a liquid absorbent member. Thereby liquid is prevented from flowing into the gas collector tube 39 and the mixture liquid is effectively collected by the mixture collector tube 43.

Figure 6:
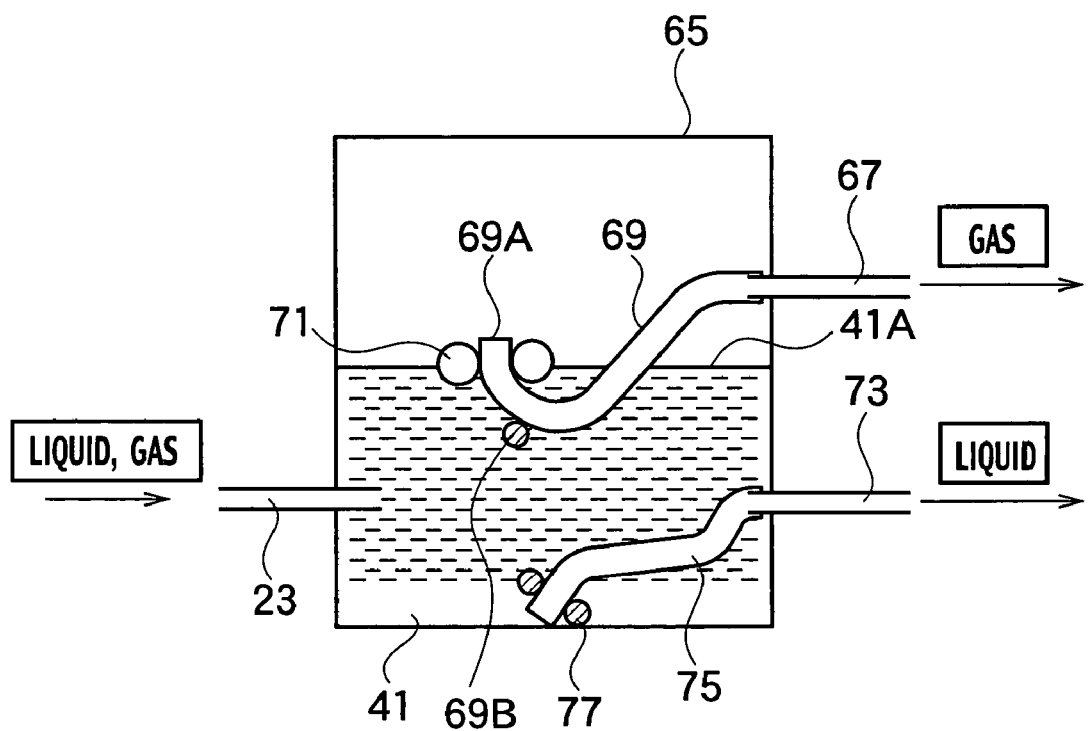
FIG. 6 is a schematic drawing of a mixing tank according to a third embodiment of the present invention.

A third embodiment of the present invention will be described hereinafter with reference to FIG. 6.

A mixing container 65 is provided with an exhaust inlet flow path 23, an exhaust outlet flow path 67 and a mixture outlet flowpath 73. As compared with the aforementioned first and second embodiments, it is characterized in that a gas collector flexible tube 69 made of a flexible material is connected with the exhaust outlet flow path 67 at an inside of the mixing container 65. A distal end of the gas collector flexible tube 69 is supported by a floating member 71 so that an opening 69A of the gas collector flexible tube 69 is steadily projected upward from the liquid level 41A. To further orient the opening 69A upward, a weight 69B is attached to the gas collector flexible tube 69 at a lower side thereof.

It is further characterized in that, at an inside of the mixing container 65, a mixture collector flexible tube 75 is connected with the mixture outlet flow path 73. A weight 77 is attached with a distal end of the mixture collector flexible tube 75 so that the mixture collector flexible tube 75 is constantly sunk in the mixture liquid 41.

According to the aforementioned constitution, the opening 69A of the gas collector flexible tube 69 is constantly projected upward from the liquid level 41A of the mixture liquid 41 however the mixing container 65 is oriented. Therefore the gas in the mixing container 65 is stably exhausted from the exhaust outlet flow path 67 via the gas collector flexible tube 69. Further, the distal end of the mixture collector flexible tube 75 is constantly sunk in the mixture liquid 41, thereby the mixture liquid 41 is stably discharged to the fuel cell via the mixture collector flexible tube 75 and the mixture outlet flow path 73.

Preferably, in the present third embodiment, the opening 69A of the gas collector flexible tube 69 is further provided with a gas-liquid separation membrane and the distal end of the mixture collector flexible tube 75 is further provided with a liquid absorbent member. Thereby liquid is prevented from flowing into the gas collector flexible tube 69 and the mixture liquid is effectively collected by the mixture collector flexible tube 75.

Figure 7:
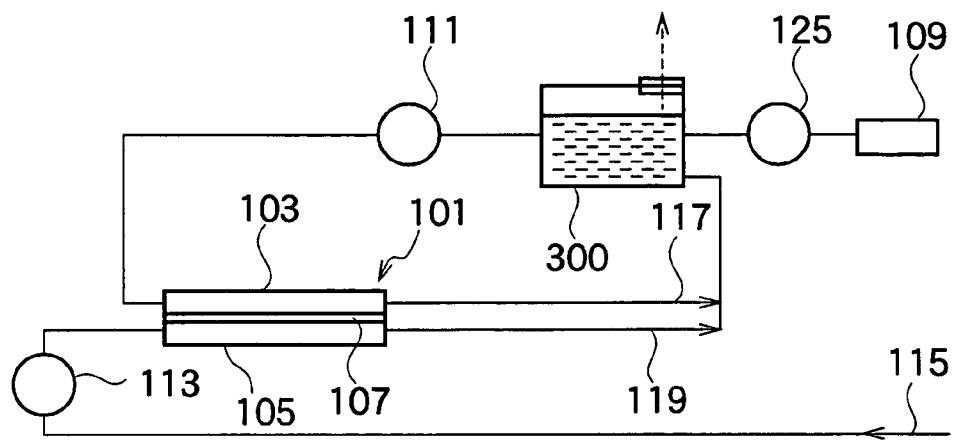
FIG. 7 is a schematic drawing of a fuel cell system of a first example, to which a mixing tank according to any of the embodiments of the present invention is applied.
Figure 8:
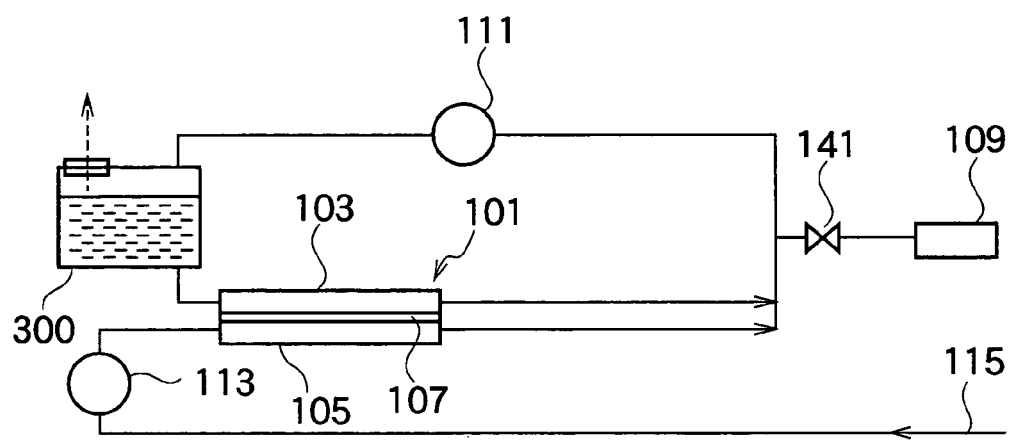
FIG. 8 is a schematic drawing of a fuel cell system of a second example, to which a mixing tank according to any of the embodiments of the present invention is applied.

The mixing tank according to any of the embodiments of the present invention is applied to a fuel cell system as a whole constitution thereof shown in FIG. 7 or FIG. 8. In the figures, a reference numeral 300 denotes the mixing tank according to any of the embodiments. According to the fuel cell system shown in FIG. 7, exhaust from either or both of an anode 103 and a cathode 105 of a fuel cell 101 is conducted into the mixing tank 300. A fuel tank 109 and a pump 125 for supplying a fuel are connected to the mixing tank 300 so that the fuel and the exhaust is mixed therein. After separating gas and liquid from the mixture at the mixing tank 300, the liquid is conducted into the anode 103 by means of a pump 111. An air supply path 115 and a pump 113 are further connected to the cathode 105 so as to introduce ambient air to the cathode 105. Power generation is achieved using the liquid and the ambient air. The mixing tank 300 may be disposed downstream of the pump 111 as shown in FIG. 8. According to such constitution, the fuel tank 109 and a valve 141 are directly connected to the exhaust tube from the fuel cell 101 so that the exhaust and the fuel are mixed in the exhaust tube. After mixing, gas-liquid separation is achieved at the mixing tank 300.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A mixing tank for a fuel cell, comprising:
   a container housing fuel for the fuel cell;
   an absorbent member housed in the container, the absorbent member having a space, wherein the space is substantially enclosed by the absorbent member;
   an inlet flow path interconnecting the fuel cell and the container so as to conduct an exhaust from the fuel cell to the container and admix the exhaust with the fuel to form a mixture absorbed in the absorbent member;
   an exhaust flow path interconnecting the space and an outside of the mixing tank so as to conduct gas in the space to the outside; and an outlet flow path interconnecting the absorbent member and the fuel cell so as to conduct the mixture absorbed in the absorbent member to the fuel cell.

2. The mixing tank of claim 1, wherein:
   an inner end of the exhaust flow path reaches the space of the absorbent member.

3. The mixing tank of claim 1, further comprising:
   a gas-liquid separation membrane at an inner end of the exhaust flow path, the gas-liquid separation membrane blocking penetration of liquid and allowing penetration of gas.

4. The mixing tank of claim 1, wherein:
   the space comprises a cavity formed in the absorbent member.

5. The mixing tank of claim 4, wherein:
   the cavity is enclosed by the absorbent member.

6. The mixing tank of claim 4, wherein:
   the cavity of the absorbent member is positioned substantially at a center of the container.

7. The mixing tank of claim 1, wherein:
   the absorbent member is adhered to the container.

8. A fuel cell system comprising:
   a fuel cell having an anode, a cathode and an electrolyte membrane put therebetween;
   a container housing fuel for the fuel cell;

an absorbent member housed in the container, the absorbent member having a cavity therein, and wherein the cavity is substantially enclosed by the absorbent member;

an inlet flow path interconnecting the fuel cell and the container so as to conduct an exhaust from the fuel cell to the container and admix the exhaust with the fuel to form a mixture absorbed in the absorbent member;

an exhaust flow path interconnecting the cavity and an outside of the mixing tank so as to conduct gas in the cavity to the outside;

an outlet flow path interconnecting the absorbent member and the fuel cell so as to conduct the mixture absorbed in the absorbent member to the fuel cell; and an air supply unit supplying air to the cathode.

* * * * *